2,842,559

SYNTHESIS OF ESTRONE INTERMEDIATES

William S. Johnson, Madison, Wis., and Robert Ellsworth Ireland, Los Angeles, Calif., assignors to Wisconsin Alumni Research Foundation, Madison, Wis., a corporation of Wisconsin No Drawing. Application October 20, 1954
Serial No. 463,604

13 Claims. (Cl. 260—345.8)

The present invention relates to improved processes and resulting products of special interest in the hormone field. More specifically the invention is directed to improvements in the synthesis of estrone described in the Johnson and Christiansen Patent No. 2,663,716. In this synthesis, the least satisfactory step is the reaction producing methyl 6 - p - anisyl - 3 - carbomethoxy - 2 - keto - 3 - methylcyclohexane-1-acetate (compound IX in the patent) which is not stereospecific, giving only relatively low yields of the desired stereoisomer having the configuration of natural estrone. We have discovered that a more favorable proportion of the desired isomer can be obtained if the carbomethoxy group attached to the same carbon as the methyl group is replaced by a cyano group. The cyano group subsequently can be converted to a carboxyl group and the synthesis carried on as described in the patent. One of the key intermediates is 6-(p-lower-alkoxyphenyl)- 3 - cyano - 2 - keto - cyclohex - 6 - ene - 1 - acetic acid. (Compound A-V of chart A where the alkoxy group is methoxy.)

The various reactions involved are illustrated in charts A, B and C. Chart A illustrates the synthesis of the cyano compound (A-V) starting with p-methoxyacetophenone (A-I) and proceeding through intermediates (A-II), (A-III) and (A-IV). Chart A also includes an alternative synthesis of the cyano compound (A-V) starting with 6 - p - anisyl - 3 - carbomethoxy - 2 - ketocyclohex-6-ene-1-acetic acid (A-VI) and proceeding through intermediates (A-VII), (A-VIII) and (A-IX). Chart B illustrates various reactions involving the cyano compound (B-V) which corresponds to compound (A-V) of chart A. These reactions include the conversion of the cyano group to a carbomethoxy group and the preparation of 6 - p - anisyl - 3 - carbomethoxy - 2 - keto - 3-methyl-cyclohexane-1-acetate (B-IV) or compound (IX) of the Johnson and Christiansen patent.

Chart C illustrates the preferred synthesis of 6-(p-lower - alkoxyphenyl) - 3 - cyano - 2 - ketocyclohex - 6-ene-1-acetic acid (C-V) (see also chart A), the esterification of this cyano compound to form the corresponding lower alkyl acetate (C-VI), the reduction of the ester to form lower alkyl 6-(p-lower-alkoxyphenyl)-3-cyano-2-ketocyclohexane-1-acetate (C-VII), and the introduction of a lower alkyl group at the 3-position to form compound (C-IX). Alternatively (C-VI) can be first alkylated to form compound (C-VIII) which is then reduced to (C-IX). (See also chart B.) As shown in chart C, $R^1$, $R^2$, $R^3$ and $R^4$ represent lower alkyl groups containing 1-6 carbon atoms. These groups which include ethyl, propyl, butyl, amyl and hexyl groups, or branched chain isomers thereof, can be used in place of the methyl groups shown in charts A and B. $R^5$ is selected from the group made up of similar lower alkyl groups and the tetrahydropyranyl group, and $R^6$, while preferably methyl, can be replaced by other lower alkyl groups containing 1-3 carbon atoms. As noted above, compounds referred to in connection with the various charts are identified by use of the appropriate chart letter, e. g. (A-I), (B-I), (C-I), etc. All temperatures given below are in ° C.

CHART A

The following examples describe the preparation of the cyano compound (A-V) as illustrated by chart A.

*6-p-anisyl-2-ketocyclohex-6-ene-1-acetic acid (A-VII)*

A suspension of 11.80 g. (0.0371 mole) of the acid (A-VI), M. P. 164–165.5°, in 150 ml. of concentrated hydrochloric acid was refluxed for two hours. After this time the solid had become an oil, and the vigorous evolution of carbon dioxide had ceased. The mixture was cooled, diluted with 50 ml. of water, and then transferred into a separatory funnel. The aqueous layer was extracted with 50% ether: ethyl acetate, and the ethereal solution washed with three 100 ml. portions of water. The organic layer was washed with saturated salt solution and dried over anhydrous magnesium sulfate. After filtration, the solvents were removed at reduced pressure, and the residue crystallized from ethyl acetate-petroleum ether (60–68°). In this manner acid (A-VII) was obtained, M. P. 134–138°. Concentration of the mother liquors afforded an additional crop, M. P. 126–133°. Recrystallization of the crude material from ethyl acetate-petroleum ether gave the acid (A-VII), M. P. 137–138°.

*6-p-anisyl-3-hydroxymethylene-2-ketocyclohex-6-ene-1-acetic acid (A-VIII)*

In a flame-dried 500-ml. three-necked flask fitted with a rubber-sealed, Hershberg wire stirrer, a reflux condenser, and a plug (all joints ground glass) was placed 75 ml. of anhydrous t-butyl alcohol (dried over calcium hydride). The system was evacuated and filled with nitrogen three times, and 1.68 g. (0.043 gram-atom) of potassium metal added. The mixture was stirred and refluxed until all the potassium metal had dissolved. The condenser was arranged for distillation and most of the t-butyl alcohol removed at reduced pressure. Then 150 ml. of dry benzene was added and approximately 50 ml. of benzene removed by distillation at atmospheric pressure in order to remove the last traces of t-butyl alcohol. The flask was then cooled in a water bath, and a solution of 2.20 g. (0.00846 mole) of the acid (A-VII), M. P. 137–138°, in 20 ml. of dry benzene was added. To this red solution was added 10.4 g. (0.11 mole) of ethyl formate in 20 ml. of dry benzene, whereupon the mixture became a homogeneous orange solution. After thirty minutes at room temperature, a yellow precipitate began to form. After the mixture had stirred at room temperature for twelve hours, 2.58 g. (0.043 mole; 2.43 ml.) of glacial acetic acid was added; this was followed by 50 ml. of a 10% aqueous hydrochloric acid solution. The mixture was transferred to a separatory funnel and diluted with an equal volume of ether. The ethereal solution was washed with eight 50-ml. portions of water. The water washes were combined and washed once with 50 ml. of ether. The combined ethereal solutions were washed with saturated salt solution and dried over anhydrous sodium sulfate. After filtration and removal of the solvents at reduced pressure, there was obtained 2.40 g. (98.4%) of (A-VIII), M. P. 168.0–170.0°, as bright yellow prisms. After three recrystallizations of a sample of this material from ethyl acetate, it was obtained as yellow, lozenge-shaped prisms, M. P. 172.0–173.5° with sweating at 170.0°.

*4,5-dihydro-6-p-anisyl[2,1-d]benzisoxazole-7-acetic acid (A-IX)*

A. *From the hydroxymethylene ketone (A-VIII).*—A solution of 2.1 g. (0.0073 mole) of the hydroxymethylene ketone (A-VIII), M. P. 168.0–170.40°, in 40 ml. of glacial acetic acid was treated with 1.52 g. (0.0219 mole) of hydroxylamine hydrochloride. The mixture was stirred by a magnetic stirring bar and refluxed for one hour during which time the hydroxylamine hydrochloride went into solution. The acetic acid was removed at reduced pressure, and the semi-solid residue was treated with a mixture of ether and water. The material was transferred to a separatory funnel with the aid of ether washings, and the aqueous layer was separated. The ethereal solution was washed twice with water, once with a saturated salt solution, and dried over anhydrous sodium sulfate. After filtration and removal of the ether at reduced pressure, a red oil was obtained. This oil was dissolved in ether, and petroleum ether (60–68°) was added to incipient turbidity. After standing overnight at room temperature, a solid had separated. Filtration gave light yellow prisms, M. P. 181–186° (dec.) with sweating at 165°. When this material was recrystallized from ethyl acetate, the isoxazole (A–IX) was obtained with M. P. 181.5–185.0° (dec.) with sweating at 178.0°.

After two recrystallizations from ethyl acetate, one from ethyl alcohol, and finally once more from ethyl acetate, the analytical sample was obtained as lozenge-shaped prisms, M. P. 184.5–185.5° (dec.) with sweating and discoloring at 182.0°.

B. *Without isolation of the hydroxymethylene intermediate (A–VIII).*—In a 1-l. flame-dried, nitrogen-filled, three-necked flask fitted with a reflux condenser, a rubber-sealed Hershberg wire stirrer, and a plug (all joints ground glass) was placed 150 ml. of anhydrous t-butyl alcohol and 5.07 g. (0.13 gram-atom) of potassium metal. After all the potassium had dissolved, the t-butyl alcohol was removed at reduced pressure, and replaced by 450 ml. of dry benzene. In order to remove the last traces of t-butyl alcohol, approximately 100 ml. of benzene was removed by distillation at atmospheric pressure. The suspension of potassium t-butoxide was cooled to 10°, and 6.35 g. (0.0244 mole) of the acid (A–VII), M. P. 137.0–138.0°, in 60 ml. of dry benzene was added. To this mixture was added 23.5 g. (0.317 mole) of ethyl formate in 50 ml. of dry benzene. After stirring overnight as the temperature rose slowly to room temperature, 7.4 ml. (7.80 g.; 0.13 mole) of glacial acetic acid was added; this was followed by 100 ml. of a 10% aqueous hydrochloric acid solution. The mixture was transferred to a separatory funnel and diluted with 150 ml. of ether. After the water layer had been separated, the ethereal solution was washed with five 100-ml. portions of water. The combined water washes were then extracted once with 100 ml. of ether. The combined ethereal solutions were washed with saturated salt solution and dried over anhydrous sodium sulfate. After filtration and removal of the solvents at reduced pressure, there was obtained a mass of bright yellow crystals. This material was not further purified but used directly in the isoxazole formation.

The above hydroxymethylene derivative (A–VIII) was dissolved in 150 ml. of glacial acetic acid and treated with 5.10 g. (0.0732 mole) of hydroxylamine hydrochloride. After the mixture had been stirred with a magnetic stirring bar and refluxed for one hour, the acetic acid was removed at reduced pressure, and the resulting semi-solid mass was treated with a mixture of ether and water. The material was transferred to a separatory funnel and ethyl acetate was added to prevent the isoxazole from crystallizing out of the ethereal solution. The water layer was separated and washed with ethyl acetate. The combined organic layers were washed four times with water, once with saturated salt solution and dried over anhydrous sodium sulfate. After filtration and removal of the solvents at reduced pressure, the isoxazole (A–IX) crystallized directly. When this solid was recrystallized from ethyl acetate, it gave the isoxazole (A–IX), M. P. 180.0–185.5° (dec.) with sweating and discoloring at 175.0°.

*β-Dimethylamino-p-methoxypropiophenone hydrochloride (A–II)*

In a 500-ml. round-bottom, one-necked flask, equipped with a magnetic stirring bar and a reflux condenser, were placed 50 g. (0.3 mole) of p-methoxyacetophenone (A–I), M. P. 38–39°, and 9.69 g. (0.323 mole) of paraformaldehyde. To this mixture was added a solution of 26.34 g. (0.323 mole) of dimethylamine hydrochloride in 150 ml. of ethyl alcohol, containing 12 drops of concentrated hydrochloric acid. The mixture was then stirred and refluxed for two and one-half hours, during which time the suspension became homogeneous. The flask was then cooled in an ice-bath, and crystallization induced by scratching. The mixture was stored in the refrigerator overnight, and the solid removed by suction filtration and washed once with cold ethyl alcohol and twice with ether. After the material had been dried in a vacuum desiccator for five hours, the amine hydrochloride (A–II), M. P. 178–178.5° was obtained.

*γ-Anisoylbutyronitrile (A–IV)*

In a 1-l., flame-dried, nitrogen-filled, three-necked flask fitted with a reflux condenser, a rubber-sealed, Hershberg wire stirrer and a plug (all joints glass ground) was placed 125 ml. of anhydrous t-butyl alcohol and 4.74 g. (0.21 gram-atom) of potassium metal. After all the potassium had dissolved, most of the t-butyl alcohol was removed at reduced pressure and replaced by 500 ml. of dry benzene. Approximately 100 ml. of benzene was removed by distillation at atmospheric pressure in order to remove the last traces of t-butyl alcohol. To this suspension of potassium t-butoxide in benzene were added 23.4 g. (0.0964 mole) of the amine hydrochloride (A–II), M. P. 178.0–178.5°, and 21.0 g. (0.149 mole) of t-butyl cyanoacetate, and the mixture was stirred and refluxed for twenty-four hours. The reaction mixture was cooled, and 100 ml. of a 5% aqueous hydrochloric acid solution was added. The material was transferred to a separatory funnel and diluted with 200 ml. of ether. The ethereal solution was washed three times with a 5% aqueous hydrochloric acid solution, once with water, once with a saturated salt solution and dried over anhydrous sodium sulfate. After filtration, the solvents were removed at reduced pressure, and the residue was transferred to a Claisen distilling flask. After a forerun of t-butyl cyanoacetate (B. P. 57.5–58°/0.8 mm., 5.02 g.), the temperature of the oil bath was raised to 140° when the ester (A–III) began to decompose, giving off isobutylene and carbon dioxide. The temperature was slowly raised to 180°, and after the evolution of gas ceased, the nitrile, (A–IV) was collected, B. P. 165–169.5°/0.32–0.55 mm. The distillate, which crystallized on standing, was dissolved in ether and allowed to stand overnight in the refrigerator. Filtration gave the nitrile (A–IV), M. P. 71.2–72.3°. Concentration and recooling of the filtrate gave another crop, M. P. 70.7–72.0°.

The analytical sample was obtained as prismatic rods by sublimation at 65°/0.01 mm., M. P. 72.7–73.2°.

*6 - p - anisyl - 3 - cyano - 2 - ketocyclohex - 6 - ene - 1 - acetic acid (A–V)*

A. *From the isoxazole (A–IX).*—In a flame-dried, nitrogen-filled, one-necked, 250-ml. flask equipped with a reflux condenser and a magnetic stirring bar was placed 100 ml. of anhydrous t-butyl alcohol and 3.40 g. (0.0875 gram-atom) of potassium metal. After the potassium had dissolved, 5.00 g. (0.0175 mole) of the isoxazole (A–IX), M. P. 180.0–185.5° (dec.) with sweating and discoloring at 175.0°, was added. After the mixture had been stirred for thirty-five minutes in an oil bath maintained between 85–90°, 25 ml. of glacial acetic acid was added, and most of the t-butyl alcohol was removed at reduced pressure. The semi-solid mass was cooled and 100 ml. of a 30% aqueous hydrochloric acid solution was added. The mixture was transferred to a separatory funnel, and the aqueous layer was extracted three times with ethyl acetate. The organic layer was then washed with water, saturated salt solution, and dried over anhydrous sodium sulfate. The solution was filtered and concentrated to approximately 25 ml. whereupon colorless crystals began to separate. Filtration of this solid afforded acid (A–V), M. P. 182–185°. When this material was recrystallized from ethyl alcohol, there was obtained colorless needles, M. P. 184.0–185.0° with sweating at 179.5°.

The analytical sample was obtained after three recrystallizations from ethyl alcohol as colorless needles, M. P. 185.5–186.2° with sweating at 182.0°.

Analysis.—Calc'd. for $C_{16}H_{15}NO_4$: C, 67.36; H, 5.30; N, 4.91. Found: C, 67.30; H, 5.16; N, 4.74.

The ultraviolet absorption spectrum of the acid (A–V), showed $\lambda_{max.}^{95\% EtOH}$ 226 m$\mu$ (4.04); 298 m$\mu$ (4.07) and $\lambda_{min.}^{95\% EtOH}$ 257 m$\mu$ (3.57).

B. From γ-anisoylbutyronitrile (A–IV).—In a flame-dried nitrogen-filled, 500 ml., three-necked flask equipped with a reflux condenser, a rubber-sealed, Hershberg wire stirrer and a plug (all joints ground glass) were placed 160 ml. of dry t-butyl alcohol and 6.45 g. (0.165 gram-atom) of potassium metal. After all the potassium had dissolved, 6.70 g. (0.033 mole) of the nitrile (A–IV), M. P. 71.2–72.3°, and 14.5 g. (12.9 ml.; 0.099 mole) of redistilled dimethyl succinate were added, and the reaction mixture stirred overnight at room temperature. Then the mixture was refluxed for six hours during which time a dark brown solid separated. After 12 ml. of glacial acetic acid was added, most of the t-butyl alcohol was removed at reduced pressure, and 70 ml. of a 10% aqueous hydrochloric acid solution was added. The mixture was then transferred to a separatory funnel, and the aqueous layer extracted three times with ethyl acetate. The combined organic layer was washed with water and then exhaustively extracted with a 10% aqueous potassium bicarbonate solution. Acidification of the combined basic extracts yielded a curdy brown solid which was taken up in ethyl acetate. The ethyl acetate solution was washed with water, saturated salt solution and dried over anhydrous sodium sulfate. After filtration, the solution was concentrated to approximately 50 ml. and seeded with the pure acid (A–V). After cooling in the refrigerator overnight, the solution was filtered by suction, yielding the acid (A–V), M. P. 181–183°. Recrystallization from ethyl alcohol raised the M. P. to 184.5–186.0 with sweating at 180.7°. On admixture with the acid from procedure A, M. P. 185.5–186.2° with sweating at 182.0°, the above material melted at 184.5–186.0 with sweating at 179.5°.

C. From β-dimethylamino-p-methoxypropiophenone hydrochloride (A–II).—In a 1-l. flame-dried, nitrogen-filled three-necked flask fitted with a reflux condenser, a rubber-sealed Hershberg wire stirrer and a plug (all joints ground glass) were placed 150 ml. of anhydrous t-butyl alcohol and 5.88 g. (0.15 gram-atom) of potassium metal. After all the potassium had dissolved, 24.3 g. (0.1 mole) of the amine hydrochloride (A–II), M. P. 178.0–178.5°, and 14.7 g. (0.13 mole) of ethyl cyanoacetate were added, and the mixture was refluxed and stirred for twenty-five hours. The flask was cooled to room temperature and a solution of 19.55 g. (0.5 gram-atom) of potassium metal in 500 ml. of anhydrous t-butyl alcohol was added. This was followed by 43.8 g. (39 ml.; 0.3 mole) of redistilled dimethyl succinate, and the reaction mixture was stirred at room temperature overnight. Then the dark brown solution was refluxed and stirred for twelve hours during which time a heavy brown solid separated. Glacial acetic acid (60 ml.) was added, and most of the t-butyl alcohol removed at reduced pressure. The residue was treated with 100 ml. of a 50% aqueous hydrochloric acid solution, and the mixture was transferred to a separatory funnel. The aqueous layer was extracted twice with ethyl acetate, and the combined ethyl acetate solutions were washed once with water and then exhaustively extracted with a 10% aqueous potassium bicarbonate solution. Acidification of the basic extracts with concentrated hydrochloric acid gave a dark red oil that was taken up in ethyl acetate. The ethyl acetate solution was washed with water, saturated salt solution and dried over anhydrous sodium sulfate. After filtration, the ethyl acetate was removed at reduced pressure, and the dark red oil that remained was dissolved in ether. The solution was seeded with the pure acid (A–V) and allowed to crystallize overnight in the refrigerator. The mother liquors were removed by a pipette, and the black red crystals that remained were recrystallized from ethyl alcohol. Filtration of the solution by suction gave light tan needles, M. P. 183.0–185.5° with sweating at 180° of the acid (A–V).

CHART B

The following examples describe the reactions illustrated in chart B.

*Methyl 6 - p - anisyl - 3 - cyano - 2 - ketocyclohex - 6 - ene - 1 - acetate (B–VI)*

A solution of 1.85 g. (0.00649 mole) of the acid (B–V), M. P. 184.5–196.0° with sweating at 180.7°, in 25 ml. of methanol was treated with excess ethereal solution of diazomethane. After the solution stood for five minutes at room temperature, the excess diazomethane was decomposed with glacial acetic acid. Most of the methanol was removed at reduced pressure, and the residue was dissolved in ether. The ethereal solution was extracted with 10% aqueous potassium bicarbonate, and then washed with water and saturated salt solution and dried over anhydrous sodium sulfate. After filtration, the ether was removed at reduced pressure, and when the residue was triturated with ether, fine needles of the ester (B–VI) were formed. The ether was removed with a pipette, and the solid was recrystallized from ethyl acetate-petroleum ether (60–68°). Removal of the solvents with a pipette afforded the ester (B–VI), M. P. 105.5–107.9°.

The analytical sample was obtained as needles after three recrystallizations from ethyl acetate-petroleum ether (60–68°), M. P. 106.9–107.9°.

Analysis.—Calc'd. for $C_{17}H_{17}NO_4$: C, 68.21; H, 5.73; N, 4.68.—Found: C, 68.08; H, 5.73; N, 4.51.

The ultraviolet absorption spectrum showed $\lambda_{max.}^{95\% EtOH}$ 227 m$\mu$ (4.08), 298 m$\mu$ (4.08) and $\lambda_{min.}^{95\% EtOH}$ 257 m$\mu$ (3.53).

The infrared absorption spectrum showed $\lambda_{max.}^{Nujol}$ 4.45 $\mu$ (cyano), 5.78 $\mu$ (ester carbonyl), 6.00 $\mu$ (conjugated ketone).

*6-p-anisyl-3-methyl-3-cyano-2-ketocyclohex-6-ene-1-acetic acid (B–X)*

A. Esterification.—In a 50-ml., round-bottom, one-necked flask containing a magnetic stirring bar was suspended 2.00 g. (0.007 mole) of the acid (B–V), M. P. 184.5–186.0° with sweating at 179.5° in a solution of 2.94 g. (0.035 mole) of dihydropyran (freshly distilled from sodium hydride) in 20 ml. of alcohol-free chloroform. To this suspension was added 10 mg. of p-toluene-sulfonic acid monohydrate, and after the mixture had been stirred at room temperature for forty-five minutes, all the solid had dissolved. The solution was allowed to stand for one hour longer, and then 1 ml. of pyridine was added to neutralize the acid catalyst. Most of the solvent was removed at reduced pressure on a water bath maintained at or below 35°, and the residue was dissolved in ether. The ethereal solution was transferred to a separatory funnel and washed successively with a 10% aqueous potassium bicarbonate solution, water, saturated salt solution and dried over anhydrous magnesium sulfate. After filtration and removal of the solvent at reduced pressure on a water bath maintained at or below 35°, there was obtained a viscous, brown oil, the tetrahydropyranyl ester (B–IX). This material was combined with the ester obtained from 1.9 g. (0.00667 mole) of the acid (B–V), M. P. 184.5–186.0 with sweating at 179.5°, under the same conditions and used in the following methylation experiment.

B. *Methylation.*—In a flame-dried, three-necked 300-ml. flask equipped with a rubber-sealed, Hershberg wire stirrer, a 125-ml. dropping funnel with pressure equalizer and a reflux condenser (all joints ground glass) was placed 25 ml. of dry benzene. After the system had been evacuated and filled with nitrogen three times, 0.35 g. (0.0146 mole) of sodium hydride was added and the dropping funnel was charged with the combined tetrahydropyranyl ester (B–IX) in 80 ml. of dry benzene. The ester was added all at once to the stirred suspension of sodium hydride, and after one-half hour the evolution of hydrogen ceased. To this red solution was added 19.4 g. (0.01367 mole) of methyl iodide. The mixture was stirred for four hours at room temperature during which time a white solid separated and then allowed to stand overnight. The solution was then heated to reflux, and 12 ml. of glacial acetic acid containing 25 mg. of p-toluenesulfonic monohydrate was added. The reaction mixture was refluxed for forty-five minutes in order to cleave the tetrahydropyranyl ester, and then approximately 45 ml. of solvent was removed by distillation. The flask was cooled, 50 ml. of water was added, and the mixture transferred to a separatory funnel. The water layer was separated and washed with 40 ml. of ether. The benzene and ethereal solutions were combined, washed twice with water, and then exhaustively extracted with a 10% aqueous potassium bicarbonate solution. Acidification of the basic extracts with concentrated hydrochloric acid gave an oil which was taken up in a mixture of ethyl acetate and ether. The ethereal solution was washed with water, saturated salt solution and dried over anhydrous sodium sulfate. After filtration and removal of the solvents at reduced pressure, there was obtained 3.57 g. of a red oil. This oil was dissolved in ether, and crystallization was induced by cooling in an ice bath and scratching. After the solution had been stored in the refrigerator overnight, the solid was separated by suction filtration and recrystallized from a mixture of chloroform and petroleum ether (60–68°). In this manner there was obtained the acid (B–X) in two crops, samples of both melting at 128.5–130.5°.

The analytical sample was obtained as colorless prisms after one recrystallization from ether and four from ethyl acetate-petroleum ether (60–68°), M. P. 131.0–132.5°.

*Methyl-6-p-anisyl-3-methyl-3-cyano-2-ketocyclohex-6-ene-1-acetate (B–VII)*

A. *From the acid (B–X).*—A solution of 1.00 g. (0.00334 mole) of the acid (B–X), M. P. 128.5–130.5°, in 30 ml. of ether was treated with an excess of ethereal diazomethane. After standing ten minutes at room temperature, the excess diazomethane was decomposed with glacial acetic acid. The solution was transferred to a separatory funnel and washed with a 10% aqueous potassium bicarbonate solution, water, saturated salt solution and dried over anhydrous sodium sulfate. After filtration and removal of the ether at reduced pressure, there was obtained (B–VII) as a brown oil.

B. *From the ester (B–VI).*—In a 100-ml., flame-dried, nitrogen-filled three-necked flask equipped with a rubber-sealed Hershberg wire-stirrer, a 125-ml. dropping funnel with pressure equalizer, and a reflux condenser was suspended 35 mg. (0.00146 mole) of sodium hydride in 10 ml. of dry benzene. The system was evacuated and filled with nitrogen, and the dropping funnel was charged with a solution of 0.400 g. (0.00134 mole) of the ester (B–VI), M. P. 105.5–107.9°, in 20 ml. of dry benzene. The ester was added all at once to the stirred suspension of sodium hydride at room temperature, and after two and one-half hours all the sodium hydride had been consumed, and the evolution of gas ceased. To the red brown solution was added 1.90 g. (0.0134 mole) of methyl iodide, and the mixture was stirred overnight at room temperature. Then 1.90 g. (0.0134 mole) of methyl iodide was added, and the mixture was refluxed for two hours. After 12 ml. of solvent had been removed by distillation, 5 ml. of glacial acetic acid was added, and the mixture was poured into a separatory funnel containing 50 ml. of water. The benzene solution was diluted with 50 ml. of ether, and the aqueous layer was separated. The ethereal solution was washed with water, a 10% aqueous potassium bicarbonate solution, water, saturated salt solution, and dried over anhydrous sodium sulfate. After filtration and removal of the solvents at reduced pressure, there was obtained 0.350 g. of light tan oil. This oil was chromatographed on 30 g. of Fuller's earth (commercial Florex).

*Fraction 1.*—The O-methylated product (B–VIII), as a crystalline solid, M. P. 110–119°, amounting to 60 mg. was eluted with 2% ether:benzene. An analytical sample was obtained as prisms after four recrystallizations from ethyl acetate, M. P. 121.5–122.5°.

*Fraction 2.*—The C-methylated product (B–VII) as a colorless oil amounting to 280 mg. was eluted with 50% ether:benzene.

*Methyl 6-p-anisyl-3-methyl-3-cyano-2-ketocyclohexane-1-acetate (B–II) (CH₃/Ar-trans) and (B–III) (CH₃/Ar-cis)*

A. *From the ester (B–VII).*—A suspension of 100 mg. of 10% palladium-on-carbon in 5 ml. of methanol (distilled from Raney nickel) was equilibrated with hydrogen at atmospheric pressure and room temperature. To this suspension was added a solution of 1.064 g. (0.0034 mole) of the oily ester (B–VII) in 25 ml. of methanol containing 15 drops of a 10% aqueous potassium hydroxide solution. After forty minutes the calculated quantity of hydrogen to satuate one double bond had been absorbed, and the uptake of gas ceased. The catalyst was removed by filtration, and the solution was made acidic to litmus with concentrated hydrochloric acid. The methanol was removed at reduced pressure, and the residue was taken up in ether and transferred to a separatory funnel. The ethereal solution was washed with water and a 10% aqueous potassium bicarbonate solution. Acidification of the basic washes with concentrated hydrochloric acid gave a solid acid, M. P. 138–153°.

The neutral ethereal solution was washed with water, saturated salt solution and dried over anhydrous sodium sulfate. After filtration and removal of the ether, there was obtained 0.948 g. of a clear oil, which crystallized on trituration with ether. Removal of the ether with a pipette gave a mixture of the two isomeric esters (B–II) (CH₃/Ar-trans) and (B–III) (CH₃/Ar-cis), M. P. 99–120°.

To purify the crystalline material, it was recrystallized from methanol, and 0.722 g. (91.8% recovery) was obtained in three crops as follows:

Crop 1: 334.5 mg., M. P. 87.0–121.0°.
Crop 2: 175.0 mg., M. P. 87.0–120.0°.
Crop 3: 212.5 mg., M. P. 80.0–118.0°.

*Crop 1.*—An attempted isomerization of 54.5 mg. of this material in methanolic sodium methoxide yielded only an oily acid.

The remaining 280 mg. was chromatographed on 30 g. of fuller's earth (commercial Florex) and 264.8 mg. (94.5% recovery) of the ester (B–II) (CH$_3$/Ar-trans), M. P. 122.0–123.0° with sweating at 121.5°, was eluted with 100% benzene. The analytical sample, obtained as needles by sublimation at 95°/0.01 mm., melted at 123.0–123.5° with sweating at 121.5°.

*Analysis.*—Calc'd. for C$_{18}$H$_{21}$NO$_4$: C, 68.56; H, 6.71. Found: C, 68.49; H, 6.76.

*Crop 2.*—This material was chromatographed on 18 g. of activated magnesium sulfate (commercial Florisil).

*Fraction A.*—This fraction, eluted with 1% ether:benzene, amounted to 156.3 mg. of the ester (B–II) (CH$_3$/Ar-trans), M. P. 121.0–123.0° with sweating at 118.0°. On admixture with the pure ester, M. P. 123.0–123.5° with sweating at 121.5°, the above ester melted at 121.0–123.0° with sweating at 118.0°.

*Fraction B.*—This fraction, eluted with 25% ether:benzene, amounted to 15.1 mg. of the ester (B–III) (CH$_3$/Ar-cis), M. P. 111.0–114.0°.

*Crop 3.*—This material was chromatographed on 21 g. of activated magnesium sulfate (Florisil).

*Fraction A.*—This fraction, amounted to 154.1 mg. of the ester (B–III) (CH$_3$/Ar-cis), M. P. 112–114°. The analytical sample was obtained after two recrystallizations from ethyl acetate-petroleum ether (60–68°) as rods, M. P. 114.5–116.1°.

*Analysis.*—Calc'd. for C$_{18}$H$_{21}$NO$_4$: C, 68.56; H, 6.71. Found: C, 68.77; H, 6.43.

On admixture with the ester (B–II) (CH$_3$/Ar-trans), M. P. 123.0–123.5° with sweating at 121.5°, the above material melted at 85–109°.

*B. From the ester (B–I):* (i) *Hydrogenation of the ester (B–VI).*—A suspension of 100 mg. of 10% palladium-on-carbon in 10 ml. of ethyl acetate was equilibrated with hydrogen at atmospheric pressure and room temperature. To this suspension was added a solution of 0.970 g. (0.00324 mole) of the ester (B–VI), M. P. 105.5–107.9°, in 25 ml. of ethyl acetate containing 3 drops of a 2% aqueous sodium hydroxide solution, and after forty-five minutes one molar equivalent of hydrogen had been absorbed. The up-take of gas did not stop at this point, but there was a break in the rate of absorption from 1.3 cc./min. to 0.7 cc./min. The reaction was stopped, and the catalyst was removed by filtration. The solution was transferred to a separatory funnel, diluted with an equal volume of ether, and washed with water and saturated salt solution and dried over anhydrous sodium sulfate. After filtration and removal of the solvents at reduced pressure, there was obtained 0.970 g. (99.5%) of the oily ester (B–I). A qualitative ultraviolet spectrum of this oil showed $$\lambda_{max.}^{95\% \text{ EtOH}}$$

226 m$\mu$, 277 m$\mu$ and 283 m$\mu$ (the spectrum due to anisole). This material was chromatographed on 100 g. of fuller's earth (commercial Florex).

*Fraction 1.*—This fraction, amounting to 274.8 mg. was an oil that was eluted with 10% ether:benzene.

*Fraction 2.*—This fraction, eluted with 2–5% ethyl alcohol:ether, amounted to 570 mg. of a dark red oil, ester (B–I). This material was used directly in the following methylation experiment. If desired the above chromatogram can be omitted, methylation being carried out directly on the (B–I) oil.

(ii) *Methylation of the ester (B–I).*—In a 100-ml., flame-dried, nitrogen-filled, three-necked flask equipped with a rubber-sealed, Hershberg wire-stirrer, a 125-ml. dropping funnel with pressure equalizer, and a reflux condenser was suspended 48 mg. (2.0 millimoles) of sodium hydride in 10 ml. of dry benzene. After the system had been evacuated and filled with nitrogen, the dropping funnel was charged with a solution of 570 mg. (1.89 millimoles) of the oily ester (B–I) in 20 ml. of dry benzene. The ester was then added all at once to the stirred suspension of sodium hydride at room temperature, and after forty-five minutes the evolution of hydrogen ceased. To this red-brown solution was added 2.84 g. (0.02 mole) of methyl iodide, and the mixture was stirred overnight at room temperature. Then 2.84 g. (0.02 mole) of methyl iodide was added, and the mixture was refluxed for two hours. After approximately 8 ml. of solvent was removed by distillation, 5 ml. of glacial acetic acid was added to decompose any excess sodium hydride, and the mixture was poured into a separatory funnel containing 30 ml. of water. The reaction vessel was washed with ether, and the ether added to the benzene solution. The aqueous layer was separated, washed once with ether, and the combined ethereal solutions were washed with water and a 10% aqueous potassium bicarbonate solution. Acidification of the basic extracts produced an oil that was taken up in ether. The ethereal solution was washed with water and saturated salt solution and dried over anhydrous sodium sulfate. After filtration and removal of the ether, there was obtained 110 mg. of an oil.

The neutral ethereal solution was washed with water and saturated salt solution and dried over anhydrous sodium sulfate. After filtration, the solvents were removed at reduced pressure, and the resulting oil was dissolved in benzene and chromatographed on 40 g. of activated magnesium sulfate (commercial Florisil).

*Fraction 1.*—This material, amounting to 87.0 mg., M. P. 120–123° with sweating at 117°, of the ester (B–II) (CH$_3$/Ar-trans), was eluted with 2% ether:benzene. Recrystallization of the material from methanol gave 60.0 mg. of the ester (B–II) (CH$_3$/Ar-trans), M. P. 121.5–123.0° with sweating at 120.0°. On admixture with the material obtained in procedure A, M. P. 123.0–123.5°, with sweating at 121.5°, the above material melted at 121.5–123.5° with sweating at 120.0°.

*Fraction 2.*—This material, eluted with 5% ether:benzene amount to 24.1 mg., M. P. 85–118°, and consisted of a mixture of the two isomeric esters (B–II) (CH$_3$/Ar-trans) and (B–III) (CH$_3$/Ar-cis).

*Fraction 3.*—This fraction, also eluted with 5% ether:benzene, consisted of 199.7 mg., M. P. 109–113°, of the ester (B–III) (CH$_3$/Ar-cis). After recrystallization of a sample from ethyl acetate-petroleum ether (60–68°), it melted at 114.0–115.5°. On admixture with the material obtained from procedure A, M. P. 114.5–116.1°, the above sample melted at 113.5–116.0°.

The (B–III) isomer which is obtained in good yield above is the compound (isomer) desired for synthesizing estrone.

*Alcoholysis of methyl 6-p-anisyl-3-methyl-3-cyano-2-ketocyclohexane-1-acetate (B–III) (CH$_3$/Ar-cis)*

A solution of 50 mg. (0.159 millimole) of the ester (B–III) (CH$_3$/Ar-cis), M. P. 109.0–113.0°, in 0.5 ml. of anhydrous methanol (distilled from calcium hydride) was saturated with dry hydrogen chloride and allowed to stand in the refrigerator for five days. After this time 0.75 ml. of water was added, and the mixture was kept in the cold for five hours. The clear, methanolic solution was then diluted with 2 ml. of water and extracted with ether. The ethereal solution was washed with water and a saturated salt solution and dried over anhydrous sodium sulfate. After filtration and removal of the ether, there was obtained 27.5 mg. of clear oil that crystallized when an ethereal solution was seeded with the ester (B–IV) (CH$_3$/Ar-cis) (compound IX of Patent No. 2,663,716).

After standing approximately five hours at room temperature, the aqueous layer became very cloudy. The above ether extraction procedure was repeated, and the oil thus obtained amounted to 30.0 mg. An ethereal solution of this oil also crystallized when seeded with the pure ester (B–IV) (CH₃/Ar-cis).

The material was combined, dissolved in ether, seeded with the pure ester (B–IV) (CH₃/Ar-cis) and allowed to stand in the refrigerator overnight. Removal of the ether with a pipette afforded 49 mg. of the ester (B–IV) (CH₃/Ar-cis), M. P. 90–95°. When this material was recrystallized from methanol, there was obtained 40 mg. of material, M. P. 95.0–95.5°. On admixture with the pure ester (B–IV) (CH₃/Ar-cis), M. P. 95.0–95.5°, the above material melted at 95.0–95.5°.

*Enol-lactone of 6-p-anisyl-3-methyl-3-cyano-2-ketocyclo-hex-6-ene-1-acetic acid (B–XI)*

A solution of 0.708 g. (0.00237 mole) of the acid (B–X), M. P. 128.5–130.5°, in 12 ml. of acetic anhydride (freshly distilled from dimethylaniline) was refluxed for six hours. After removing the solvents at reduced pressure, the residue was taken up in benzene and transferred to a separatory funnel. The benzene solution was diluted with an equal volume of ether, and the ethereal solution was washed with water, a 10% aqueous potassium bicarbonate solution, water, and saturated salt solution and dried over anhydrous sodium sulfate. After filtration and removal of the solvents at reduced pressure, the residue was transferred to a centrifuge tube, using acetone as a solvent. Removal of the acetone first in a current of air and finally at reduced pressure gave 0.700 g. of a semi-solid mass. After trituration of this material with ether and removal of the ether with a pipette, there was obtained 0.622 g. of the enol-lactone (B–XI), M. P. 164–167°, with sweating at 154°, as colorless plates.

The analytical sample, as shiny plates, was obtained after four recrystallizations from ethyl alcohol, M. P. 176.0–177.4° with sweating at 162.2°.

*Enol-lactone of 6-p-anisyl-3-methyl-3-cyano-2-ketocyclo-hexane-1-acetic acid (B–XII) (CH₃/Ar-trans)*

A suspension 30 mg. of 10% palladium-on-carbon in 5 ml. of thiophene-free benzene (distilled from Raney nickel) was equilibrated with hydrogen at atmospheric pressure and room temperature. Then a solution of 385 mg. (1.37 millimoles) of the enol-lactone (B–XI), M. P. 170.0–172.0° with sweating at 155.0°, in a mixture of 20 ml. of thiophene-free benzene and 4 ml. of methanol was added. After twenty-five minutes the calculated quantity of hydrogen to saturate one double bond had been absorbed, and the up-take of gas ceased. After the catalyst had been removed by filtration, the solvents were removed at reduced pressure. The resulting oil was dissolved in benzene and chromatographed on 39 g. of activated magnesium sulfate (commercial Florisil).

*Fraction 1.*—The enol-lactone (B–XII) (CH₃/Ar-trans), M. P. 145–155°, eluted with 10–20% ether:benzene, amounted to 373.8 mg. When this material was recrystallized from ethyl acetate, there was obtained 351.2 mg., M. P. 159.0–161.0° with sweating at 154.0°.

The analytical sample, M. P. 161.2–162.7° with sweating at 159.7°, was obtained as colorless prisms by sublimation at 132–135°/0.01 mm.

*6-p-anisyl-3-methyl-3-cyano-2-ketocyclohexane-1-acetic acid (B–XIII) (CH₃/Ar-trans)*

A. *From the ester (B–II) (CH₃/Ar-trans).*—A solution of 130 mg. (0.413 millimole) of the ester (B–II) (CH₃/Ar-trans), M. P. 121.0–123.0° with sweating at 118.2°, in 3.5 ml. of methanol was treated with 18.0 mg. (0.450 millimole; 0.42 ml. of solution of 1.078 g. of sodium hydroxide in 25 ml. of water) of sodium hydroxide, and allowed to stand at room temperature for four days. Most of the methanol was removed at reduced pressure, and the residue was dissolved in 3 ml. of water. After the aqueous layer was washed with ether, the basic solution was acidified with concentrated hydrochloric acid, and then the resulting oil was taken up in ether. The ethereal solution was washed with water and saturated salt solution and dried over anhydrous sodium sulfate. After filtration and removal of the ether at reduced pressure, there was obtained 124.4 mg. of semi-solid acid. When this material was recrystallized from ethyl acetate-petroleum ether (60–68°), there was obtained 112 mg. of the acid (B–XIII) (CH₃/Ar-trans) as needles, M. P. 153.0–156.0° with sweating at 147°.

The analytical sample, M. P. 157.8–159.8° with sweating at 148°, was obtained after two recrystallizations from ethyl acetate-petroleum ether (60–68°), as colorless needles.

B. *From the enol-lactone (B–XII) (CH₃/Ar-trans).*—A solution of 140 mg. (0.495 millimole) of the enol-lactone (B–XII) (CH₃/Ar-trans), M. P. 159.0–161.0° with sweating at 154.0°, in 3.5 ml. of methanol was treated with 20 mg. (0.50 millimole; 0.46 ml. of a solution of 1.1034 g. of sodium hydroxide in 25 ml. of water) of sodium hydroxide and allowed to stand at room temperature for six days. Most of the methanol was removed at reduced pressure, and the residue was dissolved in 3 ml. of water. After the aqueous layer was washed with ether, the basic solution was acidified with concentrated hydrochloric acid, and the resulting oil was taken up in ether. The ethereal solution was washed with saturated salt solution and dried over anhydrous sodium sulfate. After filtration and removal of the ether at reduced pressure, the resulting oil amounted to 140 mg. When this oil was triturated with ether, and the ether removed with a pipette, there was obtained 137 mg. of crystalline acid (B–XIII) (CH₃/Ar-trans), M. P. 153–155° with sweating at 141.0°. After recrystallization from ethyl acetate-petroleum ether (60–68°), this material melted at 156.5–158.5° with sweating at 141.0°.

*Alcoholysis of 6-p-anisyl-3-methyl-3-cyano-2-ketocyclo-hexane-1-acetic acid (B–XIII) (CH₃/Ar-trans)*

A solution of 42.0 mg. (0.14 millimole) of the cyano acid (B–XIII) (CH₃/Ar-trans), M. P. 157.8–159° with sweating at 148.0°, in 1 ml. of anhydrous methanol (distilled from calcium hydride) was saturated with anhydrous hydrogen chloride and allowed to stand in the refrigerator for four days. The clear, methanolic solution was then diluted with 2 ml. of water and immediately extracted with ether. Evaporation of the ether extract gave no residue.

The aqueous methanolic solution was allowed to stand at room temperature for three hours during which time it became quite cloudy, and an oil separated. This oil was taken up in ether, and the ether was washed with a 10% aqueous potassium bicarbonate solution (acidification of this basic wash afforded no acidic material), water, saturated salt solution and dried over anhydrous magnesium sulfate. After filtration and removal of the solvent, there was obtained 31.0 mg. of a clear, neutral oil (B–XV).

*Saponification of the neutral oil obtained from the alcoholysis of the acid (B–XIII) (CH₃/Ar-trans)*

A solution of 31.0 mg. (0.09 millimole) of the oily ester (B–XV) (CH₃/Ar-trans) in 0.4 ml. of absolute methanol was treated with 0.1 ml. of a 1 N aqueous sodium hydroxide solution. After standing one day at room temperature, most of the methanol was removed at reduced pressure, and 1 ml. of water was added. The aqueous solution was washed with ether and then acidified with 1 drop of concentrated hydrochloric acid. The heavy white precipitate produced on acidification was taken up in ether, and the ethereal solution washed with saturated salt solution and dried over anhydrous sodium sulfate. After filtration and removal of the ether at reduced pressure, there was obtained an oil which crystallized on seeding with the pure acid (B–XIV) (CH₃/Ar-trans). This material (B–XIV) (CH$_3$/Ar-trans) melted at 139.0–140.0°, and on admixture with a pure sample of the acid (B–XIV) (CH$_3$/Ar-trans), the melting point was 140.0–141.5°.

The above examples have illustrated the invention as outlined in chart C wherein R$^1$, R$^2$, R$^4$ and R$^6$ are methyl groups, R$^3$ is a tertiary-butyl group, and R$^5$ is a methyl or tetrahydropyranyl group. It will be understood that the homologous compounds of chart C where these groups represent other lower-alkyl or equivalent groups can be prepared by entirely analogous procedures using the appropriate reactants.

CHART A

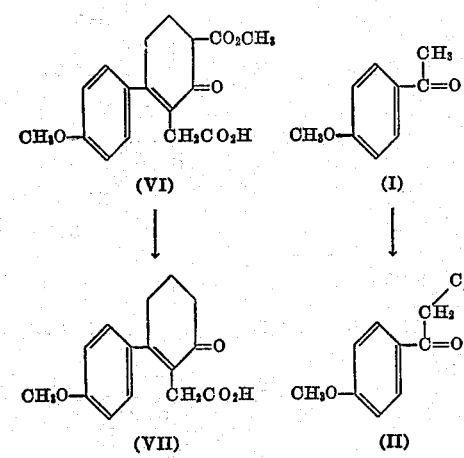

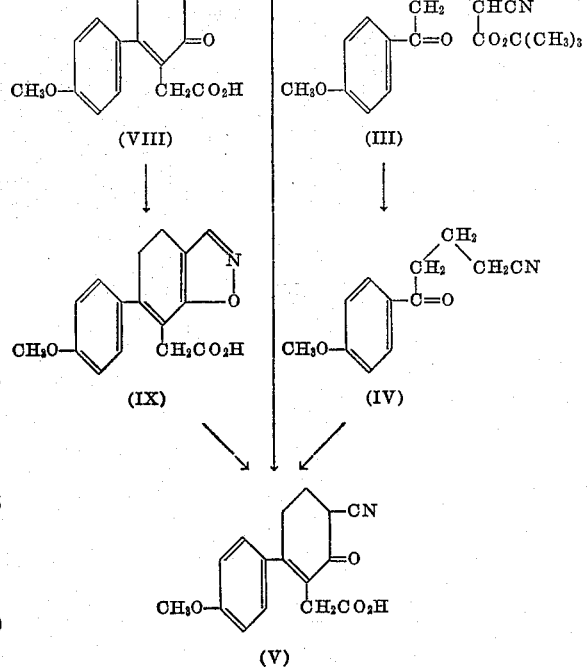

CHART B

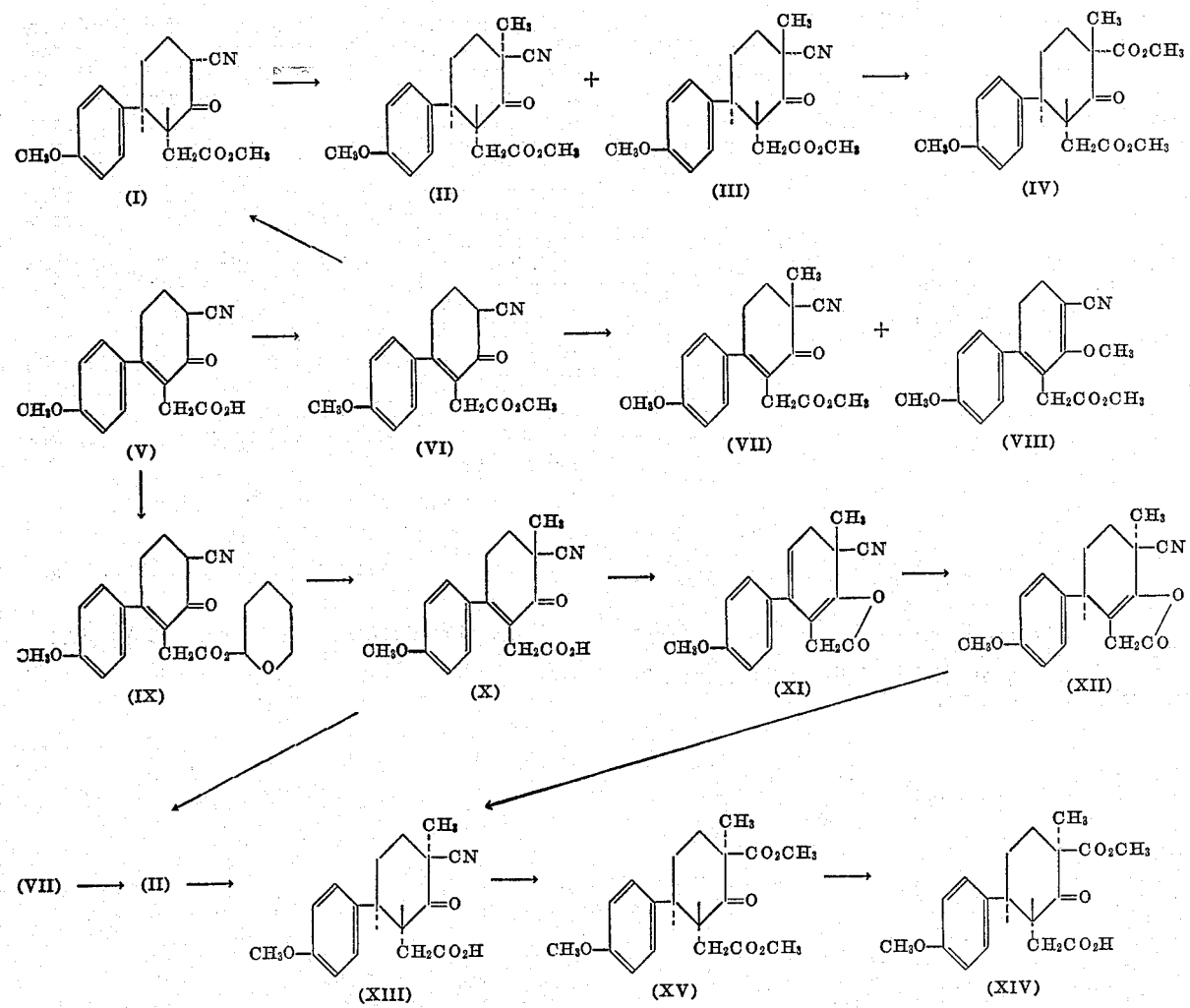

CHART C

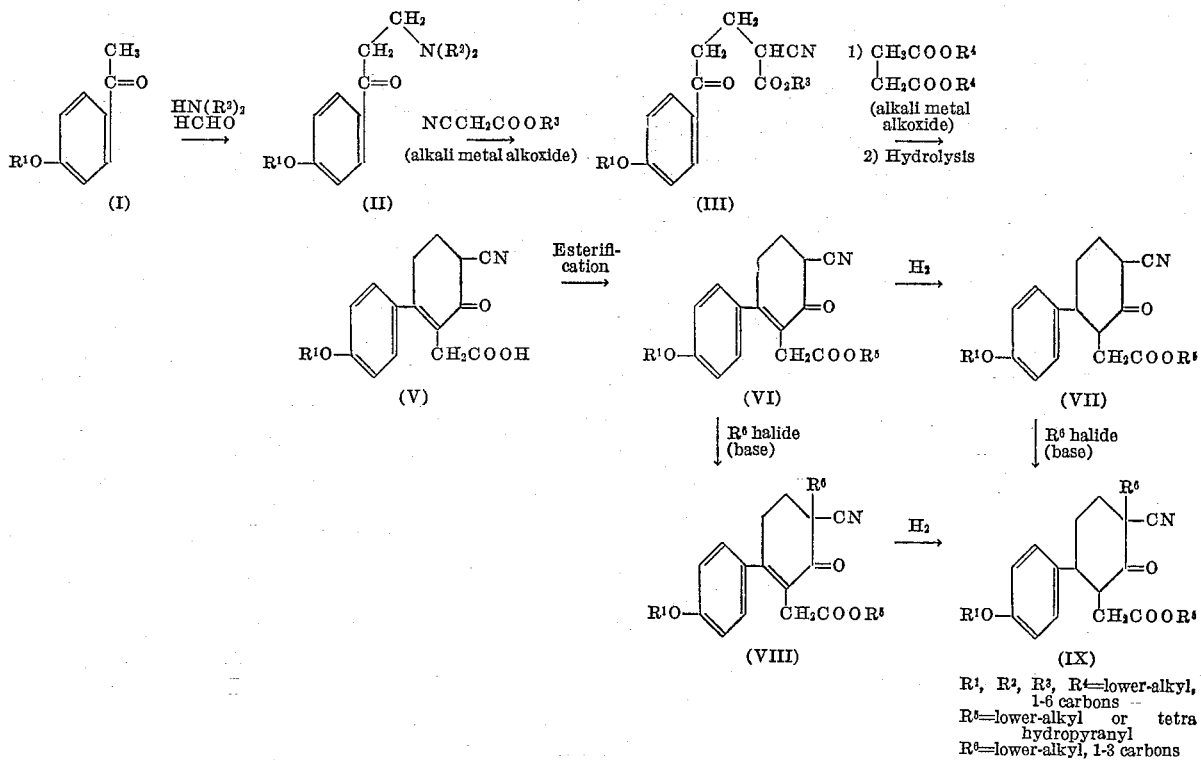

$R^1$, $R^2$, $R^3$, $R^4$ = lower-alkyl, 1-6 carbons
$R^5$ = lower-alkyl or tetrahydropyranyl
$R^6$ = lower-alkyl, 1-3 carbons It is claimed:

1. Compounds selected from the group consisting of 6-(p-RO-phenyl)-3-cyano-3-R''-2-keto-$x$-1-CH$_2$COOR', where R is a lower alkyl group, R' is a member of the group consisting of hydrogen, lower-alkyl groups and the tetrahydropyranyl group, R'' is a member of the group consisting of hydrogen and lower-alkyl groups, and $x$ is selected from the group consisting of cyclohex-6-ene and cyclohexane.

2. The product, 6-(p-lower-alkoxyphenyl)-3-cyano-2-ketocyclohex-6-ene-1-acetic acid.

3. The product, lower-alkyl 6-(p-lower-alkoxyphenyl)-3-cyano-2-ketocyclohex-6-ene-1-acetate.

4. The product, tetrahydropyranyl 6-(p-lower-alkoxyphenyl)-3-cyano-2-ketocyclohex-6-ene-1-acetate.

5. The product, lower-alkyl 6-(p-lower-alkoxyphenyl)-3-cyano-2-ketocyclohexane-1-acetate.

6. The product, lower-alkyl 6-(p-lower-alkoxyphenyl)-3-lower-alkyl-3-cyano-2-ketocyclohexane-1-acetate.

7. The product, 6-p-anisyl-3-cyano-2-ketocyclohex-6-ene-1-acetic acid.

8. The product, methyl 6-p-anisyl-3-cyano-2-ketocyclohex-6-ene-1-acetate.

9. The product, tetrahydropyranyl 6-p-anisyl-3-cyano-2-ketocyclohex-6-ene-1-acetate.

10. The product, methyl 6-p-anisyl-3-cyano-2-ketocyclohexane-1-acetate.

11. The product, methyl 6-p-anisyl-3-methyl-3-cyano-2-ketocyclohexane-1-acetate.

12. The process for the preparation of a 6-(p-lower-alkoxyphenyl)-3-cyano-2-ketocyclohex-6-ene-1-acetic acid which comprises reacting a β-(di-lower-alkylamino)-p-(lower-alkoxy)propionphenone with a lower-alkyl cyanoacetate and an alkali metal lower-alkoxide in a lower-alkanol, reacting the resulting product with a di-lower-alkyl succinate and an alkali metal lower-alkoxide in a lower-alkanol, heating the resulting mixture to effect alcoholysis and cyclization, and then hydrolyzing the reaction mixture.

13. The process for the preparation of 6-(p-anisyl)-3-cyano-2-ketocyclohex-6-ene-1-acetic acid which comprises reacting β-dimethylamino-p-methoxypropiophenone with ethyl cyanoacetate and potassium tertiary-butoxide in tertiary-butyl alcohol, reacting the resulting product with dimethyl succinate and potassium tertiary-butoxide in tertiary-butyl alcohol, heating the resulting mixture to effect alcoholysis and cyclization, and then hydrolyzing the reaction mixture.

References Cited in the file of this patent

UNITED STATES PATENTS 2,663,716     Johnson et al.     Dec. 22, 1953

OTHER REFERENCES

Woodward et al.: J. A. C. S. 74, pp. 4229-30 (1952).